(12) United States Patent
de Boer et al.

(10) Patent No.: US 8,543,994 B2
(45) Date of Patent: Sep. 24, 2013

(54) DEVELOPING JAVA SERVER COMPONENTS WITHOUT RESTARTING THE APPLICATION SERVER

(75) Inventors: Martijn de Boer, Heidelberg (DE); Mathias Essenpreis, Mühlhausen/Rettigheim (DE)

(73) Assignee: SAP AG, Walldorf (DE)

( * ) Notice: Subject to any disclaimer, the term of this patent is extended or adjusted under 35 U.S.C. 154(b) by 1315 days.

(21) Appl. No.: 11/952,920

(22) Filed: Dec. 7, 2007

(65) Prior Publication Data

US 2009/0150851 A1 Jun. 11, 2009

(51) Int. Cl.
*G06F 9/44* (2006.01)

(52) U.S. Cl.
USPC .......................................................... 717/166

(58) Field of Classification Search
None
See application file for complete search history.

(56) References Cited

U.S. PATENT DOCUMENTS

| | | | | |
|---|---|---|---|---|
| 5,901,314 | A * | 5/1999 | Boehme et al. | 717/107 |
| 6,516,349 | B1 * | 2/2003 | Lieberman | 709/225 |
| 6,597,366 | B1 * | 7/2003 | Bennett et al. | 345/619 |
| 6,675,227 | B1 * | 1/2004 | Gavrilo et al. | 719/316 |
| 6,915,511 | B2 * | 7/2005 | Susarla et al. | 717/166 |
| 7,000,238 | B2 * | 2/2006 | Nadler et al. | 719/330 |
| 7,024,668 | B2 * | 4/2006 | Shiomi et al. | 718/1 |
| 7,047,518 | B2 * | 5/2006 | Little et al. | 717/108 |
| 7,260,816 | B2 * | 8/2007 | Kar et al. | 717/136 |
| 7,395,458 | B2 * | 7/2008 | Shrivastava et al. | 714/47.2 |
| 7,516,449 | B2 * | 4/2009 | Agrawal | 717/165 |
| 7,526,771 | B2 * | 4/2009 | Roman et al. | 719/316 |
| 7,774,757 | B1 * | 8/2010 | Awasthi et al. | 717/127 |
| 7,882,501 | B1 * | 2/2011 | Carlson et al. | 717/167 |
| 2004/0015822 | A1 * | 1/2004 | Linton et al. | 717/104 |
| 2004/0221293 | A1 * | 11/2004 | Srinivas et al. | 719/310 |
| 2005/0071852 | A1 * | 3/2005 | Yoon | 719/328 |
| 2005/0155010 | A1 * | 7/2005 | George | 717/100 |
| 2005/0193392 | A1 * | 9/2005 | Carusi et al. | 719/315 |
| 2005/0234844 | A1 * | 10/2005 | Ivanov | 707/1 |
| 2005/0273667 | A1 * | 12/2005 | Shrivastava et al. | 714/38 |
| 2006/0080336 | A1 * | 4/2006 | Zhang et al. | 707/100 |
| 2007/0061795 | A1 * | 3/2007 | Atsatt | 717/166 |
| 2007/0073769 | A1 * | 3/2007 | Baikov et al. | 707/104.1 |
| 2007/0079299 | A1 * | 4/2007 | Daly | 717/141 |
| 2007/0198475 | A1 * | 8/2007 | Meduri et al. | 707/3 |
| 2007/0255720 | A1 * | 11/2007 | Baikov | 707/10 |
| 2007/0260633 | A1 * | 11/2007 | Rapicault et al. | 707/103 R |
| 2008/0022266 | A1 * | 1/2008 | Hudson | 717/140 |
| 2008/0163179 | A1 * | 7/2008 | Arnold et al. | 717/129 |
| 2008/0168102 | A1 * | 7/2008 | Parimi | 707/200 |
| 2008/0301710 | A1 * | 12/2008 | Shetty | 719/316 |
| 2009/0055836 | A1 * | 2/2009 | Supalov | 719/313 |

OTHER PUBLICATIONS

"Strict Separation of Interfaces and Implementations." Published Feb. 19, 2004.*

* cited by examiner

*Primary Examiner* — Wei Zhen
*Assistant Examiner* — Adam R Banes
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for developing components, such as Java server components, without restarting the application server hosting those components. In one aspect, there is provided a computer-implemented method. The method may include providing a component comprising an implementation class and an interface class. At the application server, access to the implementation class may be inhibited to enable the application to execute the component without restarting the application. Related apparatus, systems, methods, and articles are also described.

16 Claims, 3 Drawing Sheets

DEVELOPING JAVA SERVER COMPONENTS WITHOUT RESTARTING THE APPLICATION SERVER

BACKGROUND

An integrated development environment (IDE) refers to an application providing services to enable the development of programs. An IDE normally includes one or more of the following functions: a source code editor, a compiler, an interpreter, code building tools, a debugger, a version control system, graphical user interface construction tools, an integrated class browser, an object inspector, and a class hierarchy diagram. These functions provide a so-called "toolkit" to develop program code. NetBeans is an example of an IDE for Java-based program development.

SUMMARY

The subject matter disclosed herein provides methods and apparatus, including computer program products, for developing components, such as Java server components, without restarting the application server hosting those components. In one aspect, there is provided a computer-implemented method. The method may include providing a component comprising an implementation class and an interface class. At the application server, access to the implementation class may be inhibited to enable the application to execute the component without restarting the application. In some implementations, the application server comprises an IDE.

Variations may include one or more of the following. The provided component may also include a first classloader for the implementation class and a second classloader for the interface class. The application server may execute the component without restarting by using the first and second classloaders. Access to the implementation class may be inhibited by requiring access to the implementation through the interface class. Access to the component including the implementation class may be inhibited by defining other components calling the component. The other components may reference the interface class rather than the implementation class. The implementation class or another implementation class may be selected at an application server. The implementation class and the other implementation class may each have separate Java classloaders. The component may be accessed by calling the interface class implementing a factory pattern to load the implementation class and instantiate the loaded implementation class.

In some implementations, the subject matter described herein reduces, if not eliminates, the need to restart an application server after a component is deployed to, or selected at, the application server. Any reduction in restarts saves time when developing program code.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
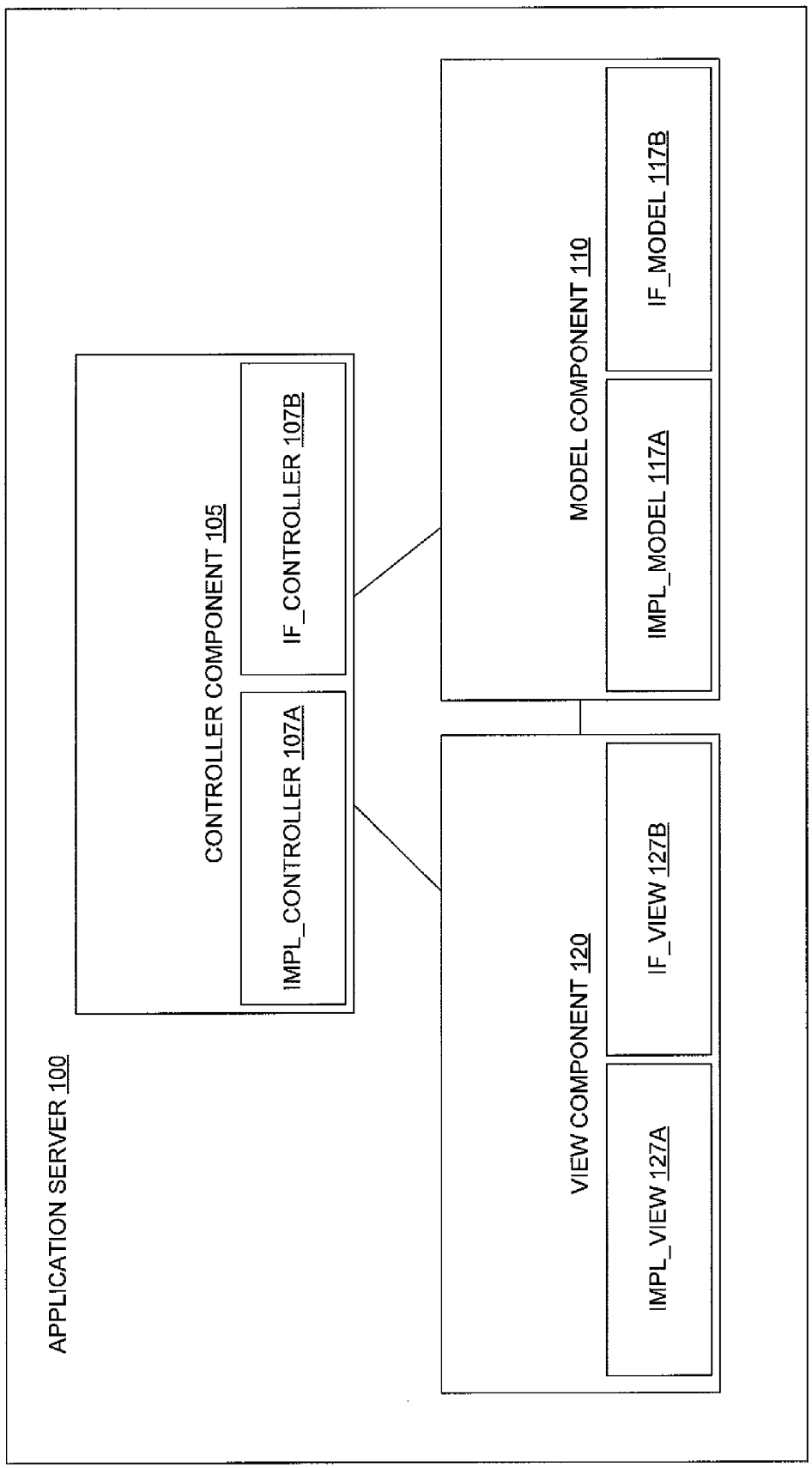
FIG. 1 depicts an application server including components, each of which includes an interface class separate from an implementation class.

Like labels are used to refer to same or similar items in the drawings.

DETAILED DESCRIPTION

An application server may execute compiled Java code to provide different services, such as web applications, web services, messaging services, and the like. However, when developing such services, a developer may code these functions in an Integrated Development Environment (IDE) as interfaces, services, libraries, and applications. Code development is typically done in an iterative manner, repeatedly deploying the developed code on an application server, testing the developed code, and further developing the code to incorporate the results of testing. Moreover, components of the developed code may have to be restarted. For example, if a bug (e.g., defect) in the code is discovered during testing, a coding change may be made, compiled, and deployed on the application server. During deployment, the application server may be restarted to incorporate the redeployed component. Restarts are, however, inconvenient as restarts take time (e.g., between 2 and 5 minutes, if not longer), increasing development time. The subject matter described herein relates to reducing restarts associated with the development of components.

FIG. 1 depicts a block diagram of an application server 100. In some implementations, application server 100 may be implemented as an integrated development environment (IDE), although application server 100 may be implemented as any other application as well. Application server 100 may include one or more components, such as a controller component 105, a model component 110, and a view component 120. The term component refers to an application or a portion of an application with a function. The components 105, 110, and 120 represent a model-view-controller design pattern, although components 105, 110, and 120 may represent other components, including services, interfaces, libraries applications, and the like.

Components 105, 110, and 120 each include classes. A class refers to a construct used to group related fields and methods. An example of a class is a Java class. The class describes the rules by which objects behave, wherein these objects are referred to as instances of that class. For example, controller component 105 includes an implementation class (labeled Impl_controller) 107*a* and an interface class (labeled If_controller) 107*b*; model component 110 includes an implementation class (labeled Impl_model) 117*a* and an interface class (labeled If_model) 117*b*; and view component 120 includes an implementation class (labeled Impl_view) 127*a* and an interface class (labeled If_view) 127*b*.

Interface classes 107*b*, 117*b*, and 127*b* may be exposed to a calling component and may include classes used as part of the implementation, such as one or more implementation classes. Interface classes 107*b*, 117*b*, and 127*b* are defined and implemented in application server 100 to be changed (e.g., modified during development) less often since interface classes 107*b*, 117*b*, and 127*b* are defined as an interface callable by other components. For example, interface classes 107b, 117b, and 127b may be part of an API (application program interface) that is public to other components and users, so that it is less likely to undergo changes.

On the other hand, implementation classes 107a, 117a, and 127a are defined and implemented in application server 100 to include functional aspects of a component, which are more likely to be changed (e.g., modified during development, patched, enhanced with additional program code, replaced, and the like) and redeployed to application server 100.

In some implementations, components 105, 110, and 120 are implemented using Java. When Java is used, interface classes and implementation classes are implemented as Java class files (e.g., .class files) loaded in a Java Virtual Machine (JVM) by a classloader. The Java class file includes information that a Java Virtual Machine uses to implement a Java class or an interface. For example, the Java class file may include one or more of the following types of information: version, constant pool, access flags, this class, super class, interfaces, fields, methods, and attributes. The classloader, such as a Java classloader, may convert a class into runtime bytecode responsible for implementing that class. The Java Virtual Machine and classloader may also be included in application server 100.

Java Virtual Machine refers to a virtual computer that runs compiled Java programs. The Java Virtual Machine is "virtual" because it is generally implemented as program code (e.g., bytecodes) on top of a "real" hardware platform and operating system. Since Java programs are compiled for the Java Virtual Machine, it may be implemented on a particular platform before compiled Java programs (e.g., into Java bytecodes) will run on that platform. The Java Virtual Machine executes Java bytecodes. The Java compiler reads Java language source (.java) files, translates the source into Java bytecodes, and places the bytecodes into class (.class) files. The compiler generates one class file per class in the source code. Although Java is described herein, other programs and languages may be used as well.

Figure 2:
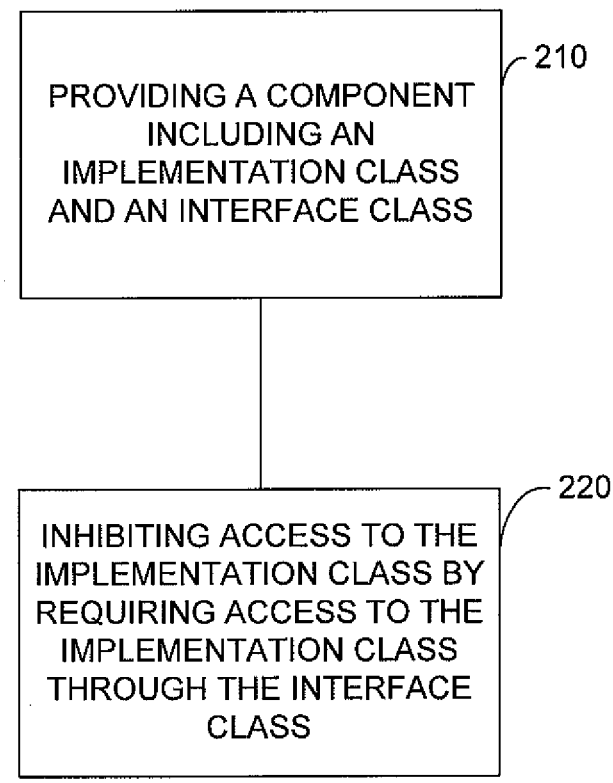
FIG. 2 is a process flow for providing the components of FIG. 1 at the application server.

FIG. 2 depicts a process 200 for deploying components, such as components 105, 110, and 120.

At 210, a component, such as component 105, is provided. Component 105 may include an implementation class 107a and a separate interface class 107b. For example, component 105 including implementation class 107a and a separate interface class 107b may be provided to an application server 100 during the development of component 105. In an IDE, component 105 may be provided by defining component 105 including a separate implementation class 107a and a separate interface class 107b. Although the above describes using component 105 and classes 107a-b, other components and classes may be used as well.

At 220, access to an implementation class, such as implementation class 107a, is inhibited. For example, access to implementation class 107a may be inhibited by hiding implementation class 107 from other components, so that the other components may not call implementation class 107. Access to implementation class 107a is instead provided by accessing interface class 107b. The subject matter described herein may thus provide two separate classes, each of which may be loaded by a classloader for the interface and a separate classloader for the implementation classes.

In some implementations, access to an implementation class, such as implementation class 107a, is inhibited by inhibiting access to the classloader for the implementation class. When this is the case, other components may only reference the interface class, such as interface class 107b, but not the implementation class, such as implementation class 107a. In some cases, implementation classes 107a, 117a, and 127a and their respective classloaders may instead be accessed through a class, such as interface classes 107b, 117b, and 127b, using a so-called "factory pattern" (also referred to as a factory as well as a factory method pattern). The phrase factory pattern refers to a method for instantiating objects. The factory pattern may use a dedicated classloader to load the implementation classes and instantiate the loaded implementation classes.

Referring again to FIG. 1, components 105, 110, and 120 may be implemented as a model-view-controller design pattern, although other implementations may be used as well. Model-view-controller is a pattern separating model component 110 and view component 120, so that changes to the view component (e.g., user interface related aspects) are decoupled from the model component (e.g., data related aspects). The controller component 105 serves to decouple the data access and business logic associated with the model component from the data presentation and user interaction associated with the view component. For example, model component 110 may be a domain-specific representation of information used by an application; view component 120 may render a model into a form suitable for interaction (e.g., as an element of a user interface); controller component 105 may process and respond to events (e.g., user actions at a view of a user interface) and may invoke changes on the model.

Table 1 below depicts an example of an interface class, and Table 2 below depicts an example of an interface class.

TABLE 1

Example Interface Class public interface Vehicle {
    //method that has to be implemented by classes that implement
    this interface public int getNumberOfWheels( );
}

TABLE 2

Example of Implementation Class public class Car implements Vehicle {
    public int getNumberOfWheels() {
        return 4;
    }
}

Referring to FIGS. 1 and 2, process 200 may provide components 105, 110, and 120 and inhibit access to implementation classes, such as implementation classes 107a, 117a, and 127a. For example, view component 120 may reference classes defined in If_controller 107b, If_Model 117b, and If_view 127b. Controller component 105 may reference classes defined in If_controller 107b, If_model 117b, and If_view 127b. Model component 110 may reference classes defined in If_model 117b.

In some implementations, the classes 107a-b, 117a-b, 127a-b are each provided with a classloader. When a change in the implementation is necessary (e.g., due to a change in program code, update, patch, enhancement or the like), application server 100 replaces a classloader of an implementation class with another classloader and implementation class (e.g., with another version of the classloader and implementation class). As there are no other components referencing the implementation interface, the classloader of the implementation class may be replaced at application server 100 without restarting application server 100 For example, when a change an implementation class, such as implementation class 117a is necessary (e.g., due to a change in program code, update, patch, enhancement or the like), application server 100 may replace classloader of implementation class 117a with another classloader using another of implementation class 117a. As there is no other component referencing implementation class 117a, the classloader of the implementation class may be replaced at application server 100 without restarting application server 100 (e.g., a JVM).

In some implementations, during a change of an implementation class, such as implementation classes 107a, 117a, and 127a, and a respective classloader of those implementation classes, the application, such as application server 100, associated with the class being changed, will be in a given state (e.g., an application session or a security session). When a server component is updated or changed, existing sessions may use the state information to identify the component version (and classloader), and existing sessions may continue to use the same version of the component as when the session was created (rather than the updated or changed component), while new sessions may use a different component version (e.g., the updated or changed session). Moreover, the classloader of the implementation classloader may also provide central monitoring services (e.g., memory consumption at application server 100, performance counters, and the like).

In some implementations, the subject matter described herein may be used to develop server components. For example, the component exposes an application-programming interface (API) to other components. The classes used by the API are contained in an interface classloader, while the implementation classes are contained in an implementation classloader accessed using a factory. Changes in the implementation are activated by replacing the implementation classloader with one using the new version of the classes. As other components can only reference the interfaces, the classloader can be replaced. For example, to access the component, the calling component calls a factory method "getInterface." The factory uses an implementation classloader to instantiate the implementation and passes it to the calling component. The calling component operates on the object and returns it to the factory when finished. When an erroneous implementation is used at the server, the factory can replace the classloader before the next call to getInterface, so that the calling component will receive the new, replaced implementation. During a change of the implementation classloader, the application may be in a given state, which may be persisted to maintain the state after the change.

Figure 3:
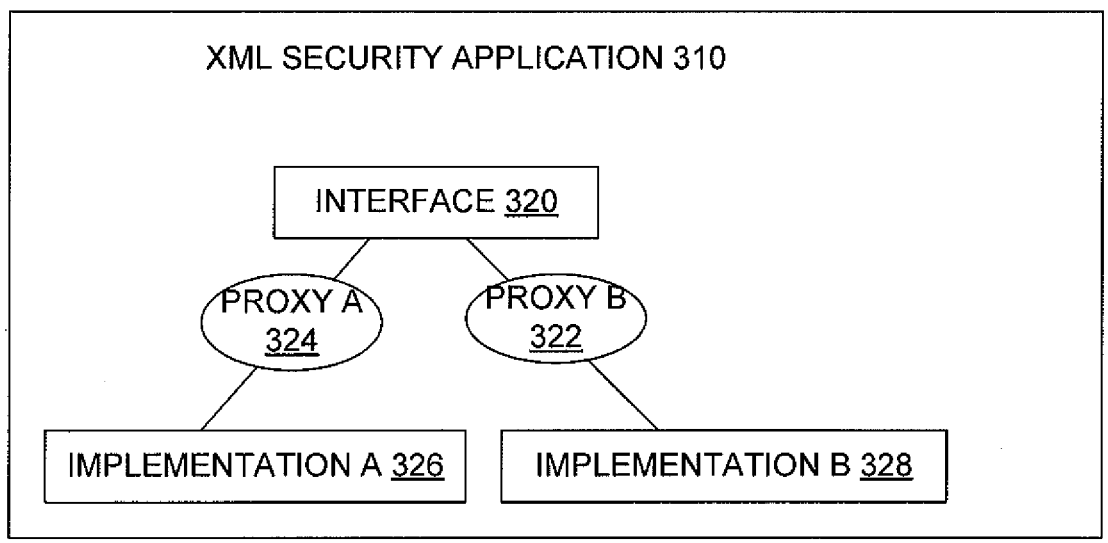
FIG. 3 depicts another application server.

FIG. 3 depicts a block diagram of an application, such as an XML security application 310. The XML security application 310 may receive messages, such as Simple Object Access Protocol (SOAP) messages and provide one or more security related features (e.g., encryption, digital signature, and the like). Proxy A 324 includes logic to determine whether its implementation, such as implementation A 326, should be invoked. Proxy B 322 includes logic to determine whether its implementation, such as implementation B 328, should be invoked. Implementations A 326 and B 328 may be provided as implementation classes each having a classloader separate from a classloader used for interface 320.

When a message is received at XML security application 310, a call is made to interface 320. Interface 320 may be implemented as an interface class. Proxy objects 324 and 322 may each determine which of the two implementations should be used to process the received message. Proxies 322 and 324 may each determine whether a version number, a counter, and the like associated with the received message corresponds to the corresponding implementation 326 and 328. When a proxy determines that the message is the correct implementation (e.g., the correct version), a classloader loads the appropriate implementation A 326 or B 328. For example, the received message may include a counter value or a version number, such as "A" or "B." In this example, proxy A 324 would use a classloader to load implementation 325, when the message corresponds to version A. On the other hand, proxy B 322 would use a classloader to load implementation 328, when the message corresponds to version B. In either case, XML security application 310 would not need to be restarted.

Moreover, FIG. 3 depicts an example of an application server using parallel versions of a component, namely implementations A 326 and implementation B 328. The subject matter may also be used when incompatible versions of a component are deployed as well. Moreover, the subject matter described herein may be used to develop components in parallel. For example, one application server may be shared by many developers. A developer may continue developing a component, which is already in use by other developers. By using separate classloaders as described above, application server 100 may include a stable, first version of the implementation and a second, development version of the implementation. Other components may use the stable version, while the developers test coding may use the development version.

Furthermore, the subject matter described herein may be used to provide a so-called "hot pluggable" component. For example, a first implementation may have a bug, which is replaced by another component having a fix to that bug. The other component may be used at an application server without restarting the application server (e.g., using process 200). The so-called other component may be considered a hot pluggable component. For example, to access a component, the calling component calls the factory method, such as "getInterface." The factory uses an implementation classloader to instantiate the implementation class and provides the instantiated implementation class to the calling component. The calling component operates on the object and returns it to the factory when finished. When a bug is encountered requiring a replacement to the implementation class, the factory may replace the classloader for the implementation class by making a subsequent call to getInterface, so that the calling component receives the corrected, hot pluggable component, e.g., implementation class (or an instantiated implementation class, i.e., an object).

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A non-transitory computer-readable medium containing instructions to configure a processor to perform a method, the method comprising:
   providing, at an application server, a component comprising an implementation class and an interface class, wherein the interface class is configured to be callable by at least another component and further configured to be changed less often than the implementation class, wherein providing includes providing a first classloader for the implementation class and a second classloader for the interface class, the application server executing the component without restarting; and
   inhibiting, at the application server, access to the implementation class to enable the application to execute the component, wherein at least another component may not call the implementation class, the access is being inhibited by inhibiting access to a classloader for the implementation class and the at least another component accesses the implementation class by accessing the interface class through a dedicated classloader, the dedicated classloader loads the implementation class and instantiates the implementation class, wherein the inhibiting includes selecting one of the implementation class and another implementation class, each of which associated with a Java classloader separate from another classloader for the interface class, the selected one being implemented at the application server.

2. The computer-readable medium of claim 1, wherein providing further comprises:
   providing the first classloader separate from the second classloader.

3. The computer-readable medium of claim 1, wherein providing further comprises:
   providing the implementation class and the interface class at an integrated development environment (IDE) at the application server.

4. The computer-readable medium of claim 1, wherein inhibiting further comprises:
   inhibiting access to the implementation class by requiring access to the implementation through the interface class.

5. The computer-readable medium of claim 1, wherein inhibiting further comprises:
   accessing the component referenced by other components calling the interface class of the component rather than the implementation class of the component.

6. The computer-readable medium of claim 1, wherein inhibiting further comprises:
   accessing the component by calling the interface class; and
   implementing, by the interface class, a factory pattern to load the implementation class and instantiate the loaded implementation class.

7. A computer-implemented method comprising:
   providing, at an application server, a component comprising an implementation class and an interface class, wherein the interface class is configured to be callable by at least another component and further configured to be changed less often than the implementation class, wherein providing includes providing a first classloader for the implementation class and a second classloader for the interface class, the application server executing the component without restarting; and
   inhibiting, at the application server, access to the implementation class to enable the application to execute the component, wherein at least another component may not call the implementation class, the access is being inhibited by inhibiting access to a classloader for the implementation class and the at least another component accesses the implementation class by accessing the interface class through a dedicated classloader, the dedicated classloader loads the implementation class and instantiates the implementation class, wherein the inhibiting includes selecting one of the implementation class and another implementation class, each of which associated with a Java classloader separate from another classloader for the interface class, the selected one being implemented at the application server.

8. The computer-implemented method of claim 7, wherein providing further comprises:
   providing the first classloader separate from the second classloader.

9. The computer-implemented method of claim 7, wherein providing further comprises:
   providing the implementation class and the interface class at an integrated development environment (IDE) at the application server.

10. The computer-implemented method of claim 7, wherein inhibiting further comprises:
    inhibiting access to the implementation class by requiring access to the implementation through the interface class.

11. The computer-implemented method of claim 7, wherein inhibiting further comprises:
    accessing the component referenced by other components calling the interface class of the component rather than the implementation class of the component.

12. The computer-implemented method of claim 7, wherein inhibiting further comprises:
    accessing the component by calling the interface class; and
    implementing, by the interface class, a factory pattern to load the implementation class and instantiate the loaded implementation class.

13. A system comprising:
    one or more processors; and
    memory including code to configure the one or more processor to perform a method comprising:
        providing, at an application server, a component comprising an implementation class and an interface class, wherein the interface class is configured to be callable by at least another component and further configured to be changed less often than the implementation class, wherein providing includes providing a first classloader for the implementation class and a second classloader for the interface class, the application server executing the component without restarting; and inhibiting, at the application server, access to the implementation class to enable the application to execute the component, wherein at least another component may not call the implementation class, the access is being inhibited by inhibiting access to a classloader for the implementation class and the at least another component accesses the implementation class by accessing the interface class through a dedicated classloader, the dedicated classloader loads the implementation class and instantiates the implementation class, wherein the inhibiting includes selecting one of the implementation class and another implementation class, each of which associated with a Java classloader separate from another classloader for the interface class, the selected one being implemented at the application server.

14. The system of claim 13, wherein inhibiting further comprises:

inhibiting access to the implementation class by requiring access to the implementation through the interface class.

15. The system of claim 13, wherein inhibiting further comprises:

accessing the component referenced by other components calling the interface class of the component rather than the implementation class of the component.

16. The system of claim 13, wherein inhibiting further comprises:

accessing the component by calling the interface class; and implementing, by the interface class, a factory pattern to load the implementation class and instantiate the loaded implementation class.

\* \* \* \* \*